United States Patent
Murray

(10) Patent No.: US 10,218,694 B2
(45) Date of Patent: Feb. 26, 2019

(54) SECURELY ORCHESTRATING EVENTS INITIATED AT REMOTE SERVERS USING A CERTIFICATE SERVER

(71) Applicant: Bank of America Corporation, Charlotte, NC (US)

(72) Inventor: Kenneth Gregory Murray, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 310 days.

(21) Appl. No.: 15/358,348

(22) Filed: Nov. 22, 2016

(65) Prior Publication Data

US 2018/0145972 A1    May 24, 2018

(51) Int. Cl.
*H04L 29/06* (2006.01)
*H04L 29/08* (2006.01)

(52) U.S. Cl.
CPC .......... *H04L 63/0823* (2013.01); *H04L 67/10* (2013.01); *H04L 67/34* (2013.01)

(58) Field of Classification Search
CPC ...... H04L 63/0823; H04L 67/10; H04L 67/34
See application file for complete search history.

(56) References Cited

U.S. PATENT DOCUMENTS

| | | | |
|---|---|---|---|
| 6,973,571 B2 | 12/2005 | Lee et al. | |
| 8,249,960 B2 | 8/2012 | Cooper et al. | |
| 8,725,638 B2 | 5/2014 | Pirzadeh et al. | |
| 8,892,475 B2 | 11/2014 | Tallent, Jr. et al. | |
| 2004/0068473 A1* | 4/2004 | Cooper | G06F 21/6254 705/75 |
| 2009/0178130 A1* | 7/2009 | Botz | G06F 21/335 726/10 |
| 2012/0265609 A1* | 10/2012 | Robert | G06Q 30/0257 705/14.49 |
| 2014/0101439 A1* | 4/2014 | Pettigrew | H04L 9/3268 713/156 |
| 2015/0106882 A1* | 4/2015 | Li | H04L 9/3263 726/4 |
| 2016/0323264 A1 | 11/2016 | Nayshtut et al. | |
| 2016/0323272 A1 | 11/2016 | Wendling et al. | |
| 2016/0323273 A1 | 11/2016 | Aufderheide, Jr. et al. | |
| 2016/0323279 A1 | 11/2016 | Raleigh | |
| 2016/0323303 A1 | 11/2016 | Thomas | |

(Continued)

*Primary Examiner* — Ayoub Alata
(74) *Attorney, Agent, or Firm* — Banner & Witcoff, Ltd.; Michael A. Springs

(57) ABSTRACT

Aspects of the disclosure relate to securely orchestrating events initiated at remote servers using a certificate server. A computing platform may receive, from a first server computer system, a first event request comprising first entity information and first event details information, and the computing platform may identify a first entity associated with the first event request. The, the computing platform may generate and send a first entity verification request to a certificate server, and the computing platform may receive, from the certificate server, first certificate information associated with the first entity. Based on validating the first certificate information associated with the first entity, the computing platform may generate and send, to a second server computer system, one or more event orchestration commands directing the second server computer system to execute one or more actions associated with the first event request.

20 Claims, 10 Drawing Sheets

(56) References Cited

U.S. PATENT DOCUMENTS

| | | |
|---|---|---|
| 2016/0323356 A1 | 11/2016 | Ribeiro et al. |
| 2016/0323734 A1 | 11/2016 | Raleigh |
| 2016/0323736 A1 | 11/2016 | Donahue et al. |
| 2016/0327942 A1 | 11/2016 | Nixon et al. |
| 2016/0328440 A1 | 11/2016 | Resch |
| 2016/0328667 A1 | 11/2016 | Macciola et al. |
| 2016/0328711 A1 | 11/2016 | Elischer |
| 2016/0330195 A1 | 11/2016 | Paert |
| 2016/0330214 A1 | 11/2016 | Roth et al. |
| 2016/0330220 A1 | 11/2016 | Dulkin et al. |
| 2016/0330221 A1 | 11/2016 | Dulkin et al. |
| 2016/0330230 A1 | 11/2016 | Reddy et al. |
| 2016/0330233 A1 | 11/2016 | Hart |
| 2016/0330236 A1 | 11/2016 | Reddy et al. |
| 2016/0330245 A1 | 11/2016 | Bell et al. |
| 2016/0330522 A1 | 11/2016 | Newell et al. |
| 2016/0330567 A1 | 11/2016 | Raleigh |
| 2016/0331035 A1 | 11/2016 | Cameron |
| 2016/0331036 A1 | 11/2016 | Cameron |
| 2016/0335030 A1* | 11/2016 | Baptist .............. G06F 17/30174 |
| 2016/0335070 A1 | 11/2016 | Aw et al. |
| 2016/0335441 A1 | 11/2016 | Aissi et al. |
| 2016/0335451 A1 | 11/2016 | Sinor |
| 2016/0335453 A1 | 11/2016 | Kounga et al. |
| 2016/0335616 A1 | 11/2016 | Bordeleau et al. |
| 2016/0335629 A1 | 11/2016 | Scott |
| 2016/0335906 A1 | 11/2016 | Foster et al. |
| 2016/0337130 A1 | 11/2016 | Buckley et al. |
| 2016/0337132 A1 | 11/2016 | Ruiter |
| 2016/0337134 A1 | 11/2016 | Robert et al. |
| 2016/0337325 A1 | 11/2016 | Blomqvist |
| 2016/0337326 A1 | 11/2016 | O'Hare et al. |
| 2016/0337329 A1 | 11/2016 | Sood et al. |
| 2016/0337342 A1 | 11/2016 | Kravitz |
| 2016/0337343 A1 | 11/2016 | Kravitz |
| 2016/0337346 A1* | 11/2016 | Momchilov ............ G06F 21/34 |
| 2016/0337348 A1 | 11/2016 | Teng et al. |
| 2016/0337354 A1 | 11/2016 | Smadja et al. |
| 2016/0337356 A1 | 11/2016 | Simon et al. |
| 2016/0337362 A1 | 11/2016 | Cameron |
| 2016/0337369 A1 | 11/2016 | Sanso |
| 2016/0337484 A1 | 11/2016 | Tola |
| 2016/0337861 A1 | 11/2016 | Hawkes et al. |
| 2016/0337862 A1 | 11/2016 | Bender et al. |
| 2016/0337883 A1 | 11/2016 | Raleigh et al. |

\* cited by examiner

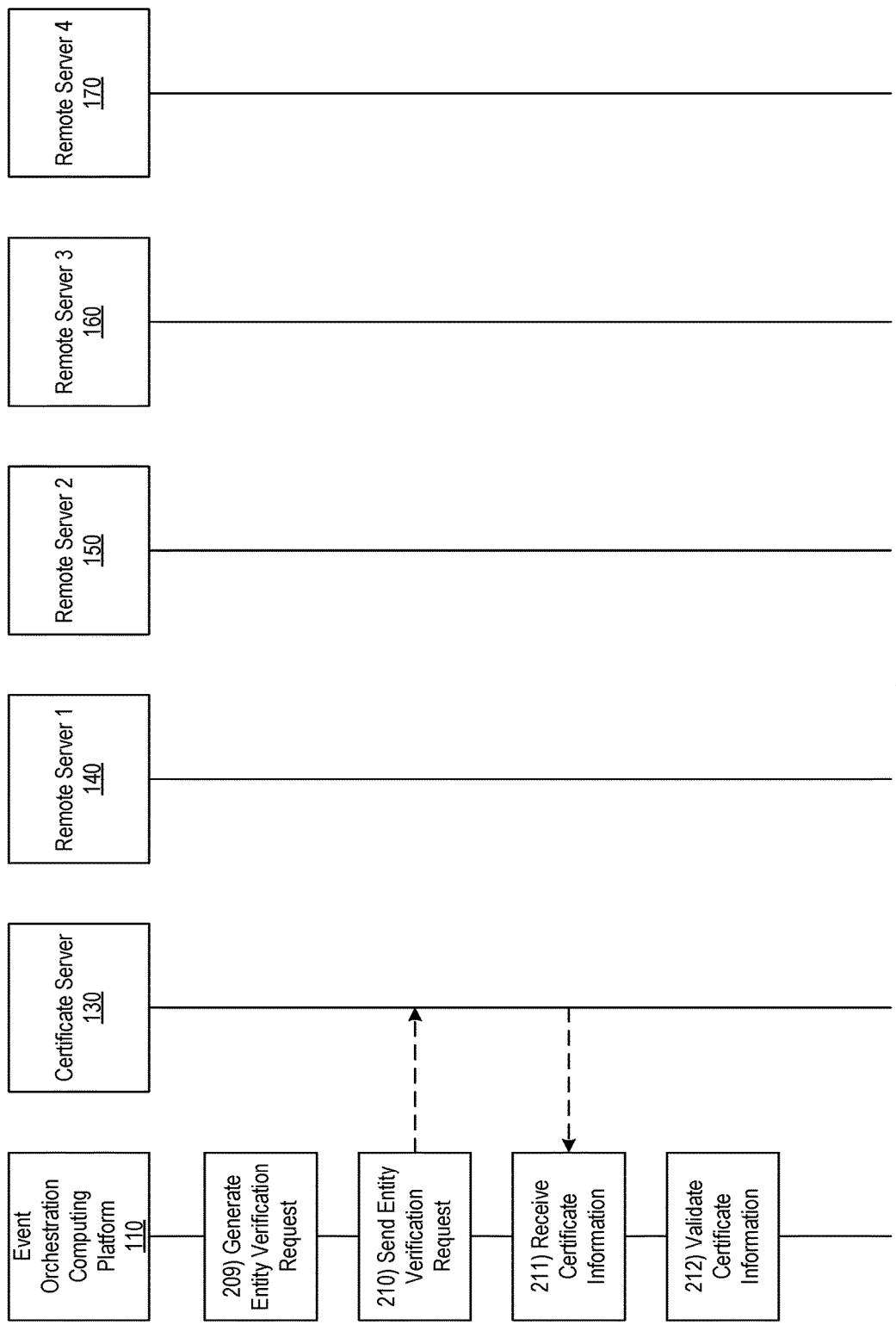

SECURELY ORCHESTRATING EVENTS INITIATED AT REMOTE SERVERS USING A CERTIFICATE SERVER

BACKGROUND

Aspects of the disclosure relate to electrical computers, digital processing systems, and multicomputer data transferring. In particular, one or more aspects of the disclosure relate to securely orchestrating events initiated at remote servers using a certificate server.

In some instances, an organization may expose and/or otherwise provide computing services to other entities and computer systems associated with such other entities. In these instances, ensuring the security of computing services provided by the organization and/or information maintained by the organization by limiting access to only authorized users and/or computer systems may be important. In many instances, however, it may be difficult to prevent unauthorized access to computing services and maintain information security, particularly when an organization implements a relatively large computing environment having many different servers and other computing resources

SUMMARY

Aspects of the disclosure provide effective, efficient, scalable, and convenient technical solutions that address and overcome technical problems associated with preventing unauthorized access to computing services and maintaining information security. In particular, one or more aspects of the disclosure provide techniques for securely orchestrating events initiated at remote servers using a certificate server.

In accordance with one or more embodiments, a computing platform having at least one processor, a memory, and a communication interface may receive, via the communication interface, from a first server computer system, a first event request comprising first entity information and first event details information. Subsequently, the computing platform may identify a first entity associated with the first event request based on the first entity information. Based on identifying the first entity associated with the first event request based on the first entity information, the computing platform may generate a first entity verification request. Then, the computing platform may send, via the communication interface, to a certificate server, the first entity verification request. Thereafter, the computing platform may receive, via the communication interface, from the certificate server, first certificate information associated with the first entity. Subsequently, the computing platform may validate the first certificate information associated with the first entity received from the certificate server. Based on validating the first certificate information associated with the first entity received from the certificate server, the computing platform may generate, based on the first entity information and the first event details information, one or more event orchestration commands directing a second server computer system to execute one or more actions associated with the first event request. Then, the computing platform may send, via the communication interface, to the second server computer system, the one or more event orchestration commands directing the second server computer system to execute the one or more actions associated with the first event request.

In some embodiments, prior to receiving the first event request from the first server computer system, the computing platform may receive, via the communication interface, from at least one remote server computer system, verification information associated with the at least one remote server computer system. Subsequently, the computing platform may generate at least one certificate for at least one entity associated with the at least one remote server computer system based on the verification information associated with the at least one remote server computer system. Then, the computing platform may send, via the communication interface, to the certificate server, the at least one certificate generated for the at least one entity associated with the at least one remote server computer system to establish a verification status for future events involving the at least one entity associated with the at least one remote server computer system.

In some embodiments, generating the at least one certificate for the at least one entity associated with the at least one remote server computer system based on the verification information associated with the at least one remote server computer system may include generating a first certificate for the first entity responsive to receiving compliance information associated with the first entity and validating the compliance information associated with the first entity based on one or more certificate generation rules.

In some embodiments, based on sending the one or more event orchestration commands directing the second server computer system to execute the one or more actions associated with the first event request, the computing platform may generate a first acknowledgement message. Subsequently, the computing platform may send, via the communication interface, to the first server computer system, the first acknowledgement message.

In some embodiments, the first acknowledgement message may include information indicating that the first certificate information associated with the first entity was validated and the one or more event orchestration commands directing the second server computer system to execute the one or more actions associated with the first event request were sent to the second server computer system.

In some embodiments, the first server computer system may be associated with a first organization in a first country, and the second server computer system may be associated with a second organization in a second country. The second organization may be different from the first organization, and the second country may be different from the first country.

In some embodiments, the first entity information may include a name and a unique identifier associated with the first entity associated with the first event request. In some embodiments, the first event details information may include information identifying a recipient associated with the first event request and a destination country associated with the first event request.

In some embodiments, the computing platform may receive, via the communication interface, from a third server computer system, a second event request comprising second entity information and second event details information. Subsequently, the computing platform may identify a second entity associated with the second event request based on the second entity information. Based on identifying the second entity associated with the second event request based on the second entity information, the computing platform may generate a second entity verification request. Then, the computing platform may send, via the communication interface, to the certificate server, the second entity verification request. Thereafter, the computing platform may receive, via the communication interface, from the certificate server, second certificate information associated with the second entity. Subsequently, the computing platform may validate the second certificate information associated with the second entity received from the certificate server. Based on validating the second certificate information associated with the second entity received from the certificate server, the computing platform may generate, based on the second entity information and the second event details information, one or more event orchestration commands directing a fourth server computer system to execute one or more actions associated with the second event request. Then, the computing platform may send, via the communication interface, to the fourth server computer system, the one or more event orchestration commands directing the fourth server computer system to execute the one or more actions associated with the second event request.

In some embodiments, based on sending the one or more event orchestration commands directing the fourth server computer system to execute the one or more actions associated with the second event request, the computing platform may generate a second acknowledgement message. Subsequently, the computing platform may send, via the communication interface, to the third server computer system, the second acknowledgement message.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for securely orchestrating events initiated at remote servers using a certificate server in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. Some aspects of the disclosure relate to creating an environment in which more certainty can be determined on who is and/or is not legitimately allowed to use a cross-border payment system. In a future state, every account holder across every bank must complete a unified questionnaire, and that information may be pulled into a central database that can be checked and in which digital certificate can be maintained. Those account holders that have a valid digital certificate may be processed quickly, and those who do not may have to go through delay and/or additional levels of rigor. In one technical implementation, certificates and/or other information may be maintained in a central computer system that is independent of a financial institution, and as a transaction is processed, a processing system may check in with the central system and sends commands to one or more bank servers and/or other systems.

Figure 1A:
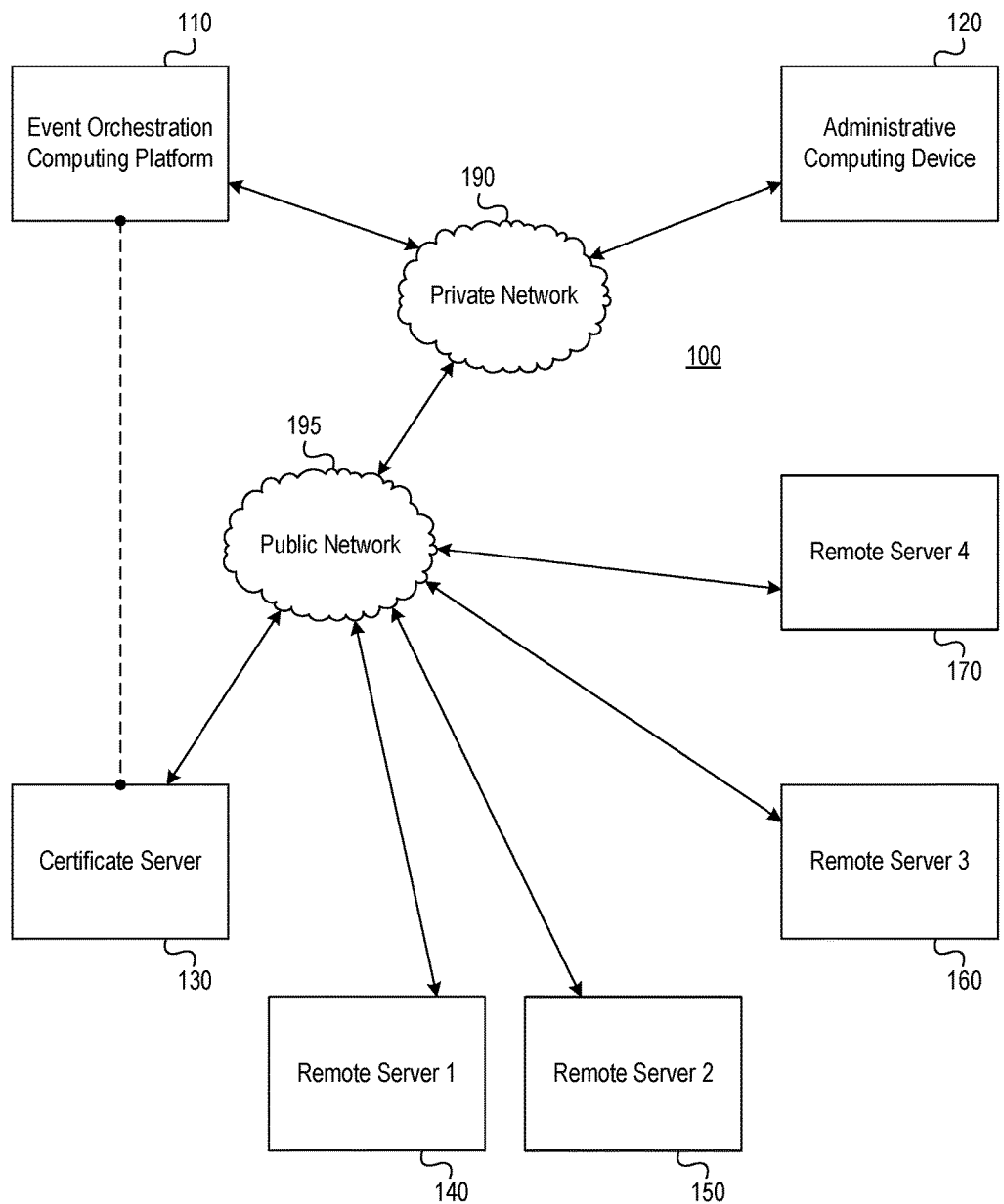
FIGS. 1A and 1B depict an illustrative computing environment for securely orchestrating events initiated at remote servers using a certificate server in accordance with one or more example embodiments.
Figure 1B:
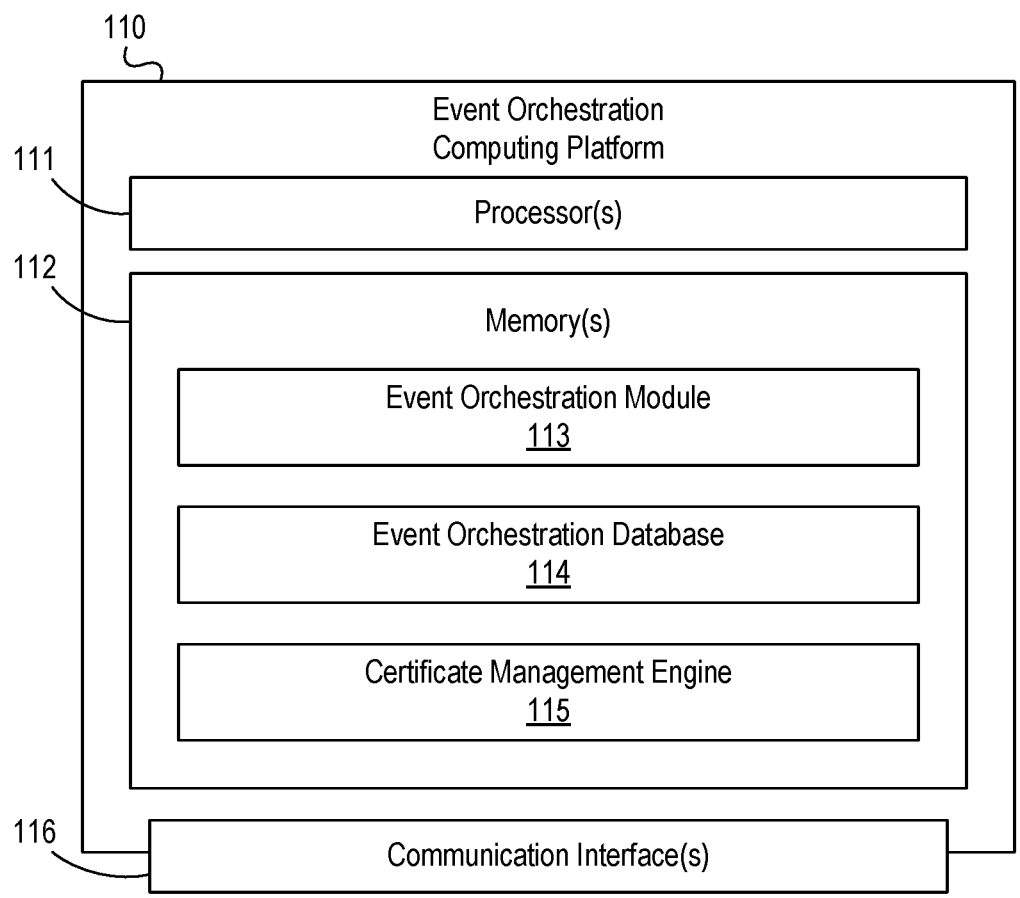

FIGS. 1A and 1B depict an illustrative computing environment for securely orchestrating events initiated at remote servers using a certificate server in accordance with one or more example embodiments. Referring to FIG. 1A, computing environment 100 may include one or more computing devices and/or other computer systems. For example, computing environment 100 may include an event orchestration computing platform 110, an administrative computing device 120, a certificate server 130, a first remote server 140, a second remote server 150, a third remote server 160, and a fourth remote server 170.

Event orchestration computing platform 110 may be configured to orchestrate events that are defined, initiated, and/or requested by one or more remote servers, control and/or direct actions of other devices and/or computer systems (e.g., in orchestrating events that are defined, initiated, and/or requested by one or more remote servers and/or in performing other actions), and/or perform other functions, as discussed in greater detail below. In some instances, event orchestration computing platform 110 may perform and/or provide one or more transaction processing functions, risk analysis functions, and/or other related functions.

Administrative computing device 120 may be configured to be used by an administrator of computing environment 100, such as an administrative user of event orchestration computing platform 110. For example, administrative computing device 120 may be configured to provide one or more user interfaces that enable an administrative user of event orchestration computing platform 110 to configure and/or control event orchestration computing platform 110 and/or one or more other computer systems and/or devices in computing environment 100.

Certificate server 130 may be configured to store and/or maintain one or more certificates. For example, certificate server 130 may be configured to store and/or maintain one or more certificates associated with one or more remote servers and/or one or more entities associated with such remote servers. Additionally or alternatively, certificate server 130 may be configured to receive certificates from event orchestration computing platform 110, generate and/or update one or more certificates (e.g., based on information received from event orchestration computing platform 110 and/or one or more remote servers), modify and/or delete one or more certificates (e.g., based on information received from event orchestration computing platform 110 and/or one or more remote servers), validate and/or verify one or more certificates (e.g., based on information received from event orchestration computing platform 110 and/or one or more remote servers), and/or perform other functions, as illustrated in greater detail below. In some instances, certificate server 130 may be provided with and/or include one or more dedicated communication links and/or dedicated communication channels, which may directly and/or securely connect certificate server 130 to the one or more other computer systems, including event orchestration computing platform 110.

Remote server 140 may be operated by and/or otherwise associated with a first organization different from the organization operating event orchestration computing platform 110. For instance, remote server 140 may be operated by and/or otherwise associated with a first financial institution different from a financial institution operating event orchestration computing platform 110. In some instances, remote server 140 may be operated by and/or otherwise associated with a financial institution that is located in a different country than the country of the financial institution operating event orchestration computing platform 110. For example, remote server 140 may request a payment transaction event in one country than involves initiating a payment to a recipient located in a different country, and event orchestration computing platform 110 (which may, e.g., be operated by a financial institution located in a country different from both the entity that initiated the payment transaction with remote server 140 and the intended recipient) may be configured to orchestrate and/or control one or more actions performed by other systems in computing environment 100, such as certificate server 130, to verify one or more certificates associated with the entity that initiated the payment transaction with remote server 140 and the intended recipient of the payment transaction to complete the payment transaction event requested and/or otherwise initiated by remote server 140.

Remote server 150 may be operated by and/or otherwise associated with a second organization different from the organization operating event orchestration computing platform 110 and the organization operating remote server 140. For instance, remote server 150 may be operated by and/or otherwise associated with a second financial institution different from the financial institutions operating event orchestration computing platform 110 and remote server 140. In some instances, remote server 150 may be operated by and/or otherwise associated with a financial institution that is located in a different country than the countries of the financial institutions operating event orchestration computing platform 110 and remote server 140.

Remote server 160 may be operated by and/or otherwise associated with a third organization different from the organizations operating event orchestration computing platform 110, remote server 140, and remote server 150. For instance, remote server 160 may be operated by and/or otherwise associated with a third financial institution different from the financial institutions operating event orchestration computing platform 110, remote server 140, and remote server 150. In some instances, remote server 160 may be operated by and/or otherwise associated with a financial institution that is located in a different country than the countries of the financial institutions operating event orchestration computing platform 110, remote server 140, and remote server 150.

Remote server 170 may be operated by and/or otherwise associated with a fourth organization different from the organizations operating event orchestration computing platform 110, remote server 140, remote server 150, and remote server 160. For instance, remote server 170 may be operated by and/or otherwise associated with a fourth financial institution different from the financial institutions operating event orchestration computing platform 110, remote server 140, remote server 150, and remote server 160. In some instances, remote server 170 may be operated by and/or otherwise associated with a financial institution that is located in a different country than the countries of the financial institutions operating event orchestration computing platform 110, remote server 140, remote server 150, and remote server 160.

In one or more arrangements, administrative computing device 120, certificate server 130, remote server 140, remote server 150, remote server 160, and remote server 170 may be any type of computing device capable of receiving a user interface, receiving input via the user interface, and communicating the received input to one or more other computing devices. For example, administrative computing device 120, certificate server 130, remote server 140, remote server 150, remote server 160, and remote server 170 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of administrative computing device 120, certificate server 130, remote server 140, remote server 150, remote server 160, and remote server 170 may, in some instances, be special-purpose computing devices configured to perform specific functions.

Computing environment 100 also may include one or more computing platforms. For example, and as noted above, computing environment 100 may include event orchestration computing platform 110. As illustrated in greater detail below, event orchestration computing platform 110 may include one or more computing devices configured to perform one or more of the functions described herein. For example, event orchestration computing platform 110 may include one or more computers (e.g., laptop computers, desktop computers, servers, server blades, or the like).

Computing environment 100 also may include one or more networks, which may interconnect one or more of event orchestration computing platform 110, administrative computing device 120, certificate server 130, remote server 140, remote server 150, remote server 160, and remote server 170. For example, computing environment 100 may include private network 190 and public network 195. Private network 190 and/or public network 195 may include one or more sub-networks (e.g., local area networks (LANs), wide area networks (WANs), or the like). Private network 190 may be associated with a particular organization (e.g., a corporation, financial institution, educational institution, governmental institution, or the like) and may interconnect one or more computing devices associated with the organization. For example, event orchestration computing platform 110 and administrative computing device 120 may be associated with an organization (e.g., a financial institution), and private network 190 may be associated with and/or operated by the organization, and may include one or more networks (e.g., LANs, WANs, virtual private networks (VPNs), or the like) that interconnect event orchestration computing platform 110, administrative computing device 120, and one or more other computing devices and/or computer systems that are used by, operated by, and/or otherwise associated with the organization. Public network 195 may connect private network 190 and/or one or more computing devices connected thereto (e.g., event orchestration computing platform 110, administrative computing device 120) with one or more networks and/or computing devices that are not associated with the organization. For example, certificate server 130, remote server 140, remote server 150, remote server 160, and remote server 170 might not be associated with an organization that operates private network 190 (e.g., because certificate server 130, remote server 140, remote server 150, remote server 160, and remote server 170 may be owned, operated, and/or serviced by one or more entities different from the organization that operates private network 190, rather than being owned and/or operated by the organization itself or an employee or affiliate of the organization), and public network 195 may include one or more networks (e.g., the internet) that connect certificate server 130, remote server 140, remote server 150, remote server 160, and remote server 170 to private network 190 and/or one or more computing devices connected thereto (e.g., event orchestration computing platform 110, administrative computing device 120).

Referring to FIG. 1B, event orchestration computing platform 110 may include one or more processors 111, memory 112, and communication interface 116. A data bus may interconnect processor(s) 111, memory 112, and communication interface 116. Communication interface 116 may be a network interface configured to support communication between event orchestration computing platform 110 and one or more networks (e.g., private network 190, public network 195, or the like). Memory 112 may include one or more program modules having instructions that when executed by processor(s) 111 cause event orchestration computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event orchestration computing platform 110 and/or by different computing devices that may form and/or otherwise make up event orchestration computing platform 110.

For example, memory 112 may have, store, and/or include an event orchestration module 113, an event orchestration database 114, and a certificate management engine 115. Event orchestration module 113 may have instructions that direct and/or cause event orchestration computing platform 110 to orchestrate one or more events involving one or more other computing devices and/or computer systems in computing environment 100 and/or perform other functions, as discussed in greater detail below. Event orchestration database 114 may store information used by event orchestration module 113 and/or event orchestration computing platform 110 in orchestrating one or more events involving one or more other computing devices and/or computer systems in computing environment 100 and/or in performing other functions. Certificate management engine 115 may have instructions that direct and/or cause event orchestration computing platform 110 to, in real-time and/or on a continuous basis, generate and/or update one or more certificates (which may, e.g., be stored and/or maintained by certificate server 130), modify and/or delete one or more certificates (which may, e.g., be stored and/or maintained by certificate server 130), validate and/or verify one or more certificates (which may, e.g., be stored and/or maintained by certificate server 130), and/or otherwise perform one or more certificate management functions in real-time and/or on a continuous basis (e.g., as one or more event requests are received by event orchestration computing platform 110 from one or more remote servers, such as remote server 140, remote server 150, remote server 160, and remote server 170).

Figure 2A:
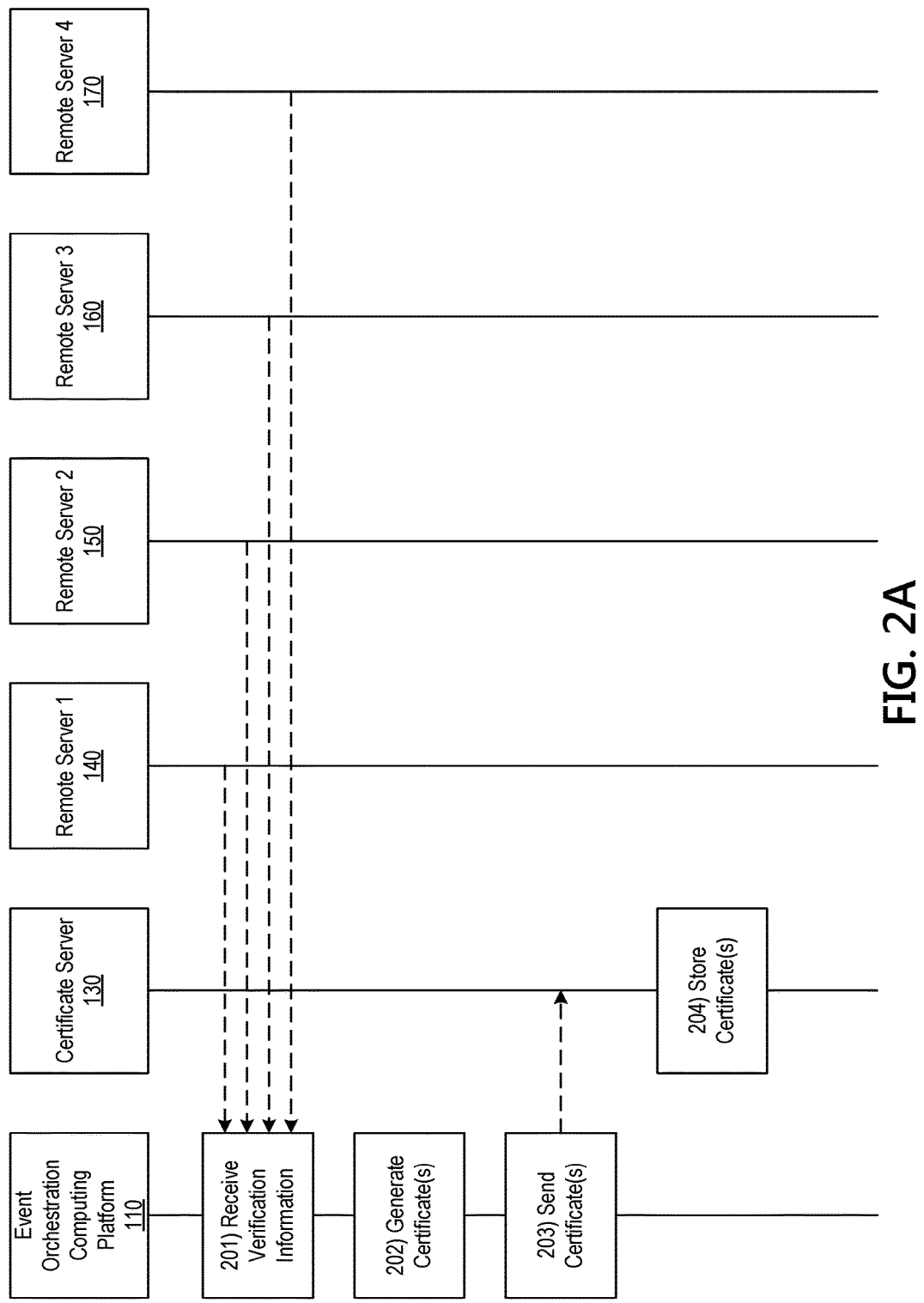

FIGS. 2A-2G depict an illustrative event sequence for securely orchestrating events initiated at remote servers using a certificate server in accordance with one or more example embodiments. Referring to FIG. 2A, at step 201, event orchestration computing platform 110 may receive verification information from one or more remote servers. For example, at step 201, event orchestration computing platform 110 may receive, via the communication interface (e.g., communication interface 116), from at least one remote server computer system (e.g., remote server 140, remote server 150, remote server 160, and/or remote server 170), verification information associated with the at least one remote server computer system (e.g., remote server 140, remote server 150, remote server 160, and/or remote server 170). For example, each remote server computer system (e.g., remote server 140, remote server 150, remote server 160, and/or remote server 170) may be operated by and/or otherwise associated with a different financial institution located in a different country. In addition, the remote server computer systems (e.g., remote server 140, remote server 150, remote server 160, and/or remote server 170) and/or the financial institutions operating the remote server computer systems (e.g., remote server 140, remote server 150, remote server 160, and/or remote server 170) may send such verification information to event orchestration computing platform 110 to register one or more entities with event orchestration computing platform 110 and/or to obtain and/or trigger event orchestration computing platform 110 to generate one or more certificates for such entities, so as to establish an entity verification status for such entities. As illustrated in greater detail below, the one or more certificates generated by event orchestration computing platform 110 may establish an entity verification status for such entities and/or may be usable by such entities and/or such remote server computer systems (e.g., remote server 140, remote server 150, remote server 160, and/or remote server 170) to utilize event orchestration computing platform 110 in facilitating cross-border payment transaction events involving different financial institutions in different countries. In some instances, such cross-border payment transaction events also may involve exchanging funds between two or more different currencies.

At step 202, event orchestration computing platform 110 may generate one or more certificates based on the verification information received by event orchestration computing platform 110 from the one or more remote servers. For example, at step 202, event orchestration computing platform 110 may generate at least one certificate for at least one entity associated with the at least one remote server computer system (e.g., remote server 140, remote server 150, remote server 160, and/or remote server 170) based on the verification information associated with the at least one remote server computer system (e.g., remote server 140, remote server 150, remote server 160, and/or remote server 170). The one or more certificates (which may, e.g., be generated by event orchestration computing platform 110 based on the verification information received by event orchestration computing platform 110) may be uniquely bound to and/or otherwise correspond to a particular server and/or a particular entity associated with a particular server. For instance, the one or more certificates (which may, e.g., be generated by event orchestration computing platform 110 based on the verification information received by event orchestration computing platform 110) may be generated by event orchestration computing platform 110 using a public key, a private key linked to a particular server and/or a particular entity associated with the particular server, and/or a unique identifier linked to a particular server and/or a particular entity associated with the particular server (which may, e.g., be included in the verification information received by event orchestration computing platform 110).

In some embodiments, generating the at least one certificate for the at least one entity associated with the at least one remote server computer system based on the verification information associated with the at least one remote server computer system may include generating a first certificate for the first entity responsive to receiving compliance information associated with the first entity and validating the compliance information associated with the first entity based on one or more certificate generation rules. For example, in generating the at least one certificate for the at least one entity associated with the at least one remote server computer system (e.g., remote server 140, remote server 150, remote server 160, and/or remote server 170) based on the verification information associated with the at least one remote server computer system (e.g., remote server 140, remote server 150, remote server 160, and/or remote server 170), event orchestration computing platform 110 may generate a first certificate for the first entity responsive to receiving compliance information associated with the first entity and validating the compliance information associated with the first entity based on one or more certificate generation rules. For instance, event orchestration computing platform 110 may receive compliance information associated with the first entity, and subsequently, event orchestration computing platform 110 may validate such compliance information based on one or more certificate generation rules that may be stored by event orchestration computing platform 110 in one or more rules databases. The one or more certificate generation rules (which may, e.g., be stored by event orchestration computing platform 110) may define circumstances and/or conditions in which certain compliance information is valid and/or invalid for purposes of certificate generation, so as to prevent unauthorized use and/or malicious use of event orchestration computing platform 110, organization computer systems and/or services, financial systems and/or networks, and/or other computer systems.

At step 203, event orchestration computing platform 110 may send the one or more certificates generated by event orchestration computing platform 110 to certificate server 130. For example, at step 203, event orchestration computing platform 110 may send, via the communication interface (e.g., communication interface 116), to the certificate server (e.g., certificate server 130), the at least one certificate generated for the at least one entity associated with the at least one remote server computer system (e.g., remote server 140, remote server 150, remote server 160, and/or remote server 170) to establish a verification status for future events involving the at least one entity associated with the at least one remote server computer system (e.g., remote server 140, remote server 150, remote server 160, and/or remote server 170). In doing this, event orchestration computing platform 110 may, for instance, also perform similar steps to establish a verification status for the first entity, the second entity, and/or one or more other entities involved in the requests discussed in the examples below.

At step 204, certificate server 130 may store the one or more certificates received from event orchestration computing platform 110. For example, certificate server 130 may receive, store, and/or update one or more certificates maintained by certificate server 130 in one or more databases and/or other files and/or records (e.g., based on information received from event orchestration computing platform 110).

Figure 2B:
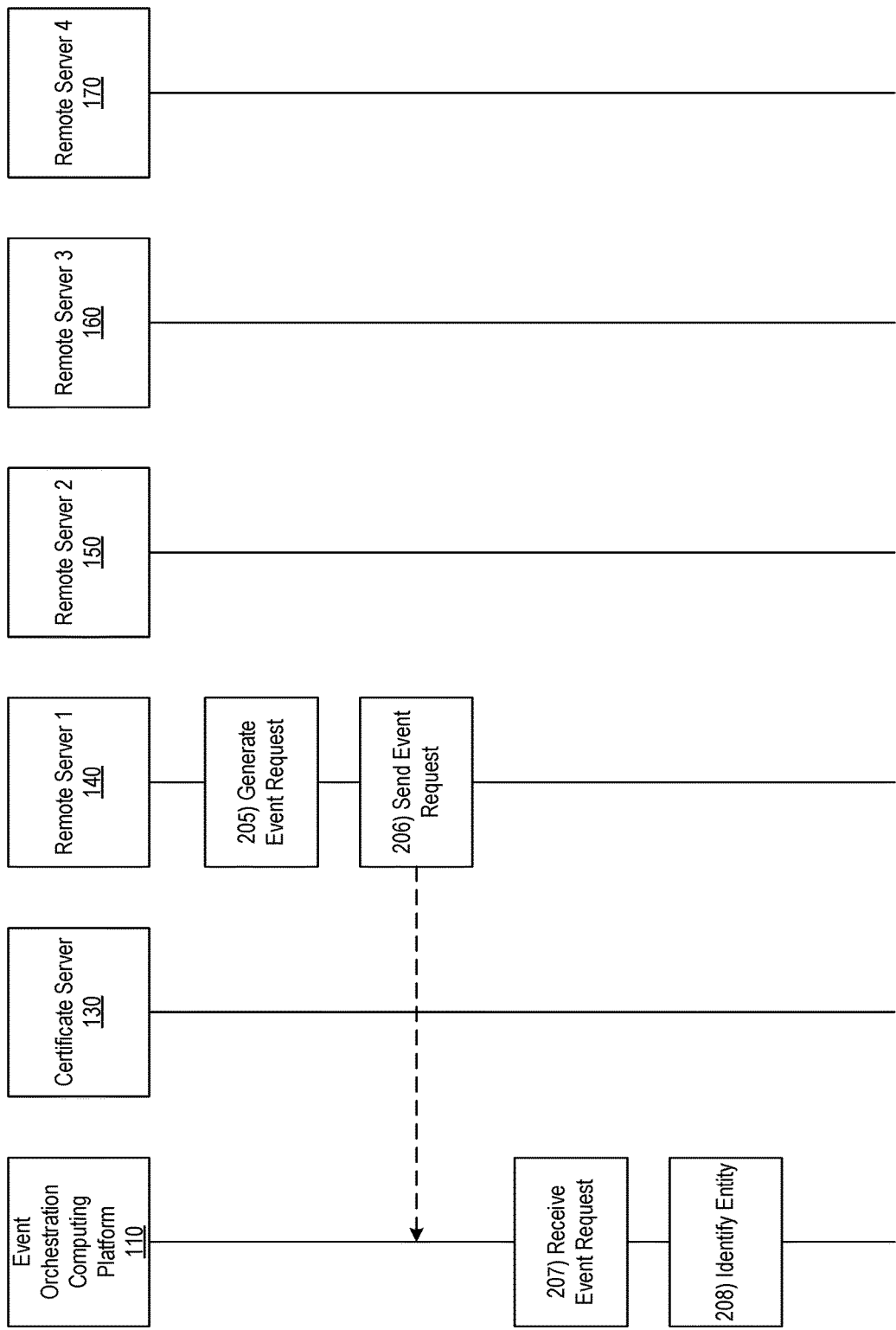

Referring to FIG. 2B, at step 205, remote server 140 may generate an event request. For example, remote server 140 may generate an event request defining and/or otherwise requesting a payment transaction involving a payment to be made from an entity associated with remote server 140 (e.g., a customer of a financial institution operating remote server 140) to another entity in another country foreign to and/or different from the country of the entity associated with remote server 140. At step 206, remote server 140 may send the event request to event orchestration computing platform 110.

At step 207, event orchestration computing platform 110 may receive the event request from remote server 140. For example, at step 207, event orchestration computing platform 110 may receive, via the communication interface (e.g., communication interface 116), from a first server computer system (e.g., remote server 140), a first event request comprising first entity information and first event details information. In some embodiments, the first entity information comprises a name and a unique identifier associated with the first entity associated with the first event request. For example, the first entity information (which may, e.g., be included in the event request received by event orchestration computing platform 110) may include a name and a unique identifier associated with the first entity associated with the first event request. In some embodiments, the first event details information comprises information identifying a recipient associated with the first event request and a destination country associated with the first event request. For example, the first event details information (which may, e.g., be included in the event request received by event orchestration computing platform 110) may include information identifying a recipient associated with the first event request and a destination country associated with the first event request. In some instances, the event request received by event orchestration computing platform 110 thus may include information identifying an originator or payor of a new payment transaction event requested by remote server 140, an amount of funds to be transferred or paid to complete the new payment transaction event requested by remote server 140, and an intended recipient or payee of the new payment transaction event requested by remote server 140.

At step 208, event orchestration computing platform 110 may identify an entity associated with the event request. For example, at step 208, event orchestration computing platform 110 may identify a first entity associated with the first event request based on the first entity information. In identifying the first entity associated with the first event request based on the first entity information, event orchestration computing platform 110 may, for instance, identify the originator or payor who initiated the payment transaction event corresponding to the event request.

Referring to FIG. 2C, at step 209, event orchestration computing platform 110 may generate an entity verification request. For example, at step 209, based on identifying the first entity associated with the first event request based on the first entity information, event orchestration computing platform 110 may generate a first entity verification request. For instance, event orchestration computing platform 110 may generate an entity verification request that directs and/or causes certificate server 130 to return and/or validate a certificate corresponding to the first entity associated with the first event request, so as to determine whether and/or confirm that the first entity associated with the first event request is authorized and/or otherwise allowed to request the payment transaction event for processing by event orchestration computing platform 110.

At step 210, event orchestration computing platform 110 may send the entity verification request to certificate server 130. For example, at step 210, event orchestration computing platform 110 may send, via the communication interface (e.g., communication interface 116), to a certificate server (e.g., certificate server 130), the first entity verification request.

At step 211, event orchestration computing platform 110 may receive certificate information from certificate server 130. For example, at step 211, event orchestration computing platform 110 may receive, via the communication interface (e.g., communication interface 116), from the certificate server (e.g., certificate server 130), first certificate information associated with the first entity. In some instances, the certificate information (which may, e.g., be received by event orchestration computing platform 110 from certificate server 130) may include a certificate itself, such as a certificate corresponding to the entity identified in the entity verification request sent to certificate server 130 by event orchestration computing platform 110. In some instances, the certificate information (which may, e.g., be received by event orchestration computing platform 110 from certificate server 130) may additionally or alternatively include information indicating that certificate server 130 maintains (or does not maintain) a valid certificate corresponding to the entity identified in the entity verification request sent to certificate server 130 by event orchestration computing platform 110.

At step 212, event orchestration computing platform 110 may validate the certificate information received from certificate server 130. For example, at step 212, event orchestration computing platform 110 may validate the first certificate information associated with the first entity received from the certificate server (e.g., certificate server 130). In validating the first certificate information associated with the first entity received from the certificate server (e.g., certificate server 130), event orchestration computing platform 110 may determine whether the first certificate information associated with the first entity received from the certificate server (e.g., certificate server 130) is valid. For example, if event orchestration computing platform 110 determines that the first certificate information associated with the first entity received from the certificate server (e.g., certificate server 130) is not valid, event orchestration computing platform 110 may generate and/or send one or more error messages (e.g., to remote server 140 and/or one or more other systems and/or devices) and/or the example event sequence may end. Alternatively, if event orchestration computing platform 110 determines that the first certificate information associated with the first entity received from the certificate server (e.g., certificate server 130) is valid, the example event sequence may proceed to step 213 as illustrated in FIG. 2D and as described below.

Figure 2D:
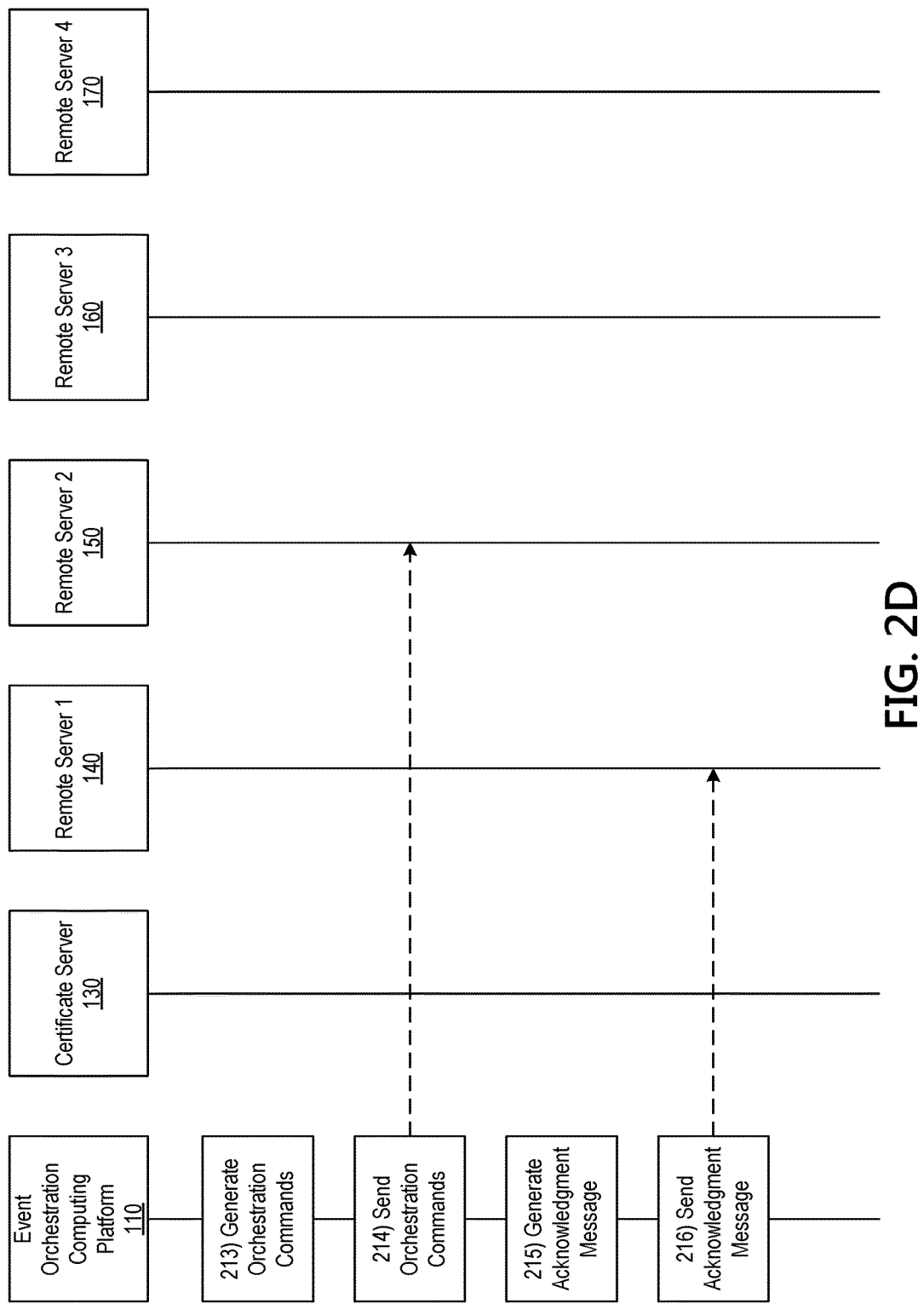

Referring to FIG. 2D, at step 213, event orchestration computing platform 110 may generate one or more orchestration commands (e.g., based on validating the certificate information). For example, at step 213, based on validating the first certificate information associated with the first entity received from the certificate server (e.g., certificate server 130), event orchestration computing platform 110 may generate, based on the first entity information and the first event details information, one or more event orchestration commands directing a second server computer system (e.g., remote server 150) to execute one or more actions associated with the first event request. For instance, based on validating the certificate information, event orchestration computing platform 110 may allow the requested payment transaction event to occur and/or coordinate performance of the requested payment transaction event by commanding remote server 150 to execute one or more actions that facilitate completion of the requested payment transaction event.

At step 214, event orchestration computing platform 110 may send the one or more orchestration commands to remote server 150. For example, at step 214, event orchestration computing platform 110 may send, via the communication interface (e.g., communication interface 116), to the second server computer system (e.g., remote server 150), the one or more event orchestration commands directing the second server computer system (e.g., remote server 150) to execute the one or more actions associated with the first event request.

In some embodiments, the first server computer system may be associated with a first organization in a first country, and the second server computer system may be associated with a second organization in a second country. In addition, the second organization may be different from the first organization, and the second country may be different from the first country. For example, the first server computer system (e.g., remote server 140) may be associated with a first organization in a first country, and the second server computer system (e.g., remote server 150) may be associated with a second organization in a second country, where the second organization may be different from the first organization, and the second country may be different from the first country. In this way, event orchestration computing platform 110 may securely process, validate, control, and/or otherwise facilitate payment transaction events involving different entities and servers located in different countries, while ensuring compliance with legal and/or regulatory requirements and/or other rules.

At step 215, event orchestration computing platform 110 may generate an acknowledgement message. For example, at step 215, based on sending the one or more event orchestration commands directing the second server computer system (e.g., remote server 150) to execute the one or more actions associated with the first event request, event orchestration computing platform 110 may generate a first acknowledgement message. Such an acknowledgement message may, for example, indicate that the one or more commands have been sent to remote server 150, that the one or more actions have been performed, that the requested payment transaction event is being processed, and/or otherwise indicate the current status of the requested payment transaction event.

In some embodiments, the first acknowledgement message comprises information indicating that the first certificate information associated with the first entity was validated and the one or more event orchestration commands directing the second server computer system to execute the one or more actions associated with the first event request were sent to the second server computer system. For example, the first acknowledgement message (which may, e.g., be generated by event orchestration computing platform 110 at step 215) may include information indicating that the first certificate information associated with the first entity was validated (e.g., by event orchestration computing platform 110) and the one or more event orchestration commands directing the second server computer system (e.g., remote server 150) to execute the one or more actions associated with the first event request were sent to the second server computer system (e.g., remote server 150).

At step 216, event orchestration computing platform 110 may send the acknowledgment message to remote server 140. For example, at step 216, event orchestration computing platform 110 may send, via the communication interface (e.g., communication interface 116), to the first server computer system (e.g., remote server 140), the first acknowledgement message. For instance, event orchestration computing platform 110 may send such an acknowledgment message to advise the entity and/or system that requested the payment transaction event of the current status of the requested payment transaction event. Subsequently, event orchestration computing platform 110 may execute one or more actions similar to those discussed above in processing additional requests received from the same and/or other server computer systems, as illustrated in greater detail below.

Figure 2E:
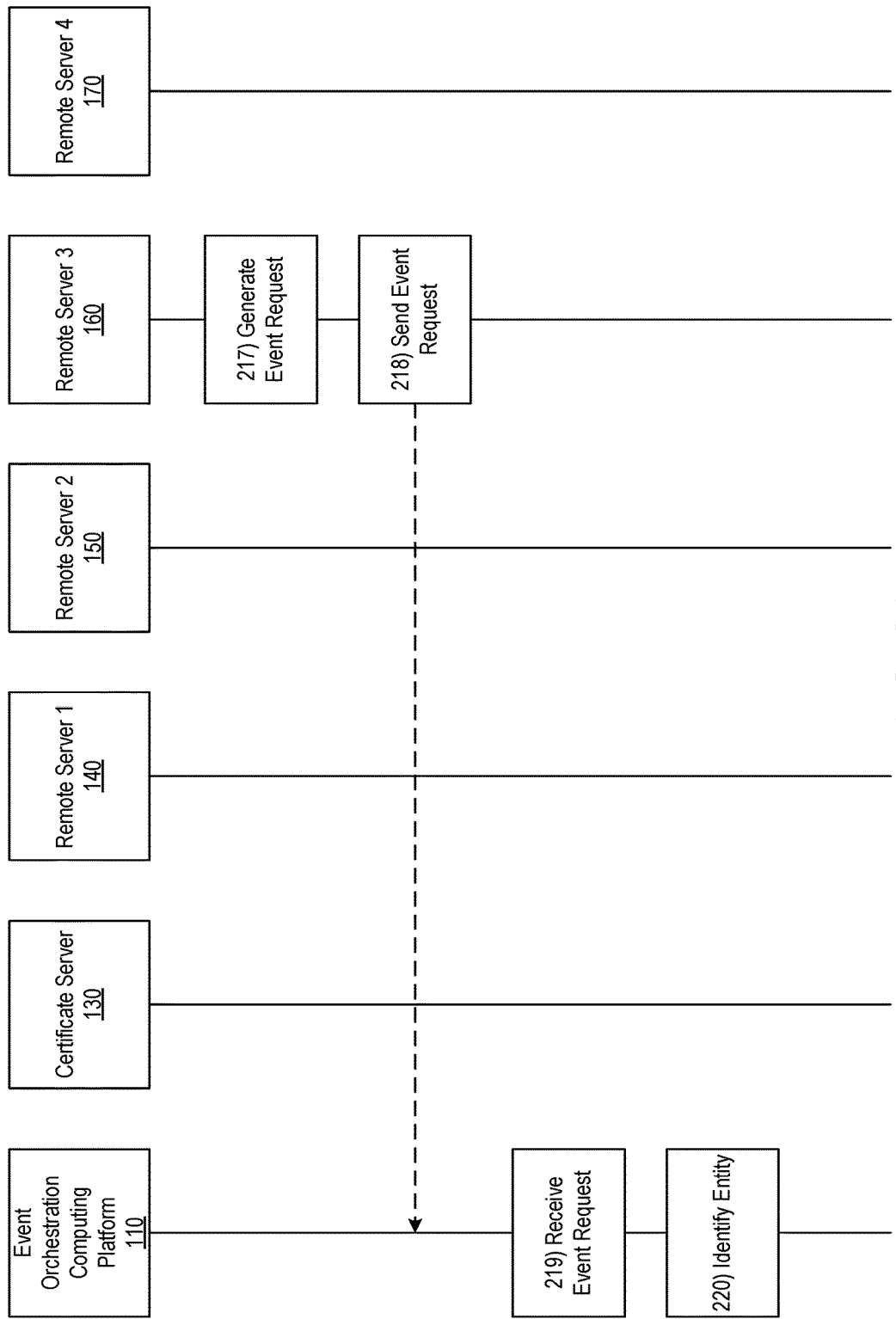

Referring to FIG. 2E, at step 217, remote server 160 may generate an event request. For example, remote server 160 may generate an event request defining and/or otherwise requesting a payment transaction involving a payment to be made from an entity associated with remote server 160 (e.g., a customer of a financial institution operating remote server 160) to another entity in another country foreign to and/or different from the country of the entity associated with remote server 160. At step 218, remote server 160 may send the event request to event orchestration computing platform 110.

At step 219, event orchestration computing platform 110 may receive the event request from remote server 160. For example, at step 219, event orchestration computing platform 110 may receive, via the communication interface (e.g., communication interface 116), from a third server computer system (e.g., remote server 160), a second event request comprising second entity information and second event details information. In some embodiments, the second entity information comprises a name and a unique identifier associated with the second entity associated with the second event request. For example, the second entity information (which may, e.g., be included in the event request received by event orchestration computing platform 110) may include a name and a unique identifier associated with the second entity associated with the second event request. In some embodiments, the second event details information comprises information identifying a recipient associated with the second event request and a destination country associated with the second event request. For example, the second event details information (which may, e.g., be included in the event request received by event orchestration computing platform 110) may include information identifying a recipient associated with the second event request and a destination country associated with the second event request. In some instances, the event request received by event orchestration computing platform 110 thus may include information identifying an originator or payor of a new payment transaction event requested by remote server 160, an amount of funds to be transferred or paid to complete the new payment transaction event requested by remote server 160, and an intended recipient or payee of the new payment transaction event requested by remote server 160.

At step 220, event orchestration computing platform 110 may identify an entity associated with the event request. For example, at step 220, event orchestration computing platform 110 may identify a second entity associated with the second event request based on the second entity information. In identifying the second entity associated with the second event request based on the second entity information, event orchestration computing platform 110 may, for instance, identify the originator or payor who initiated the payment transaction event corresponding to the event request.

Figure 2F:
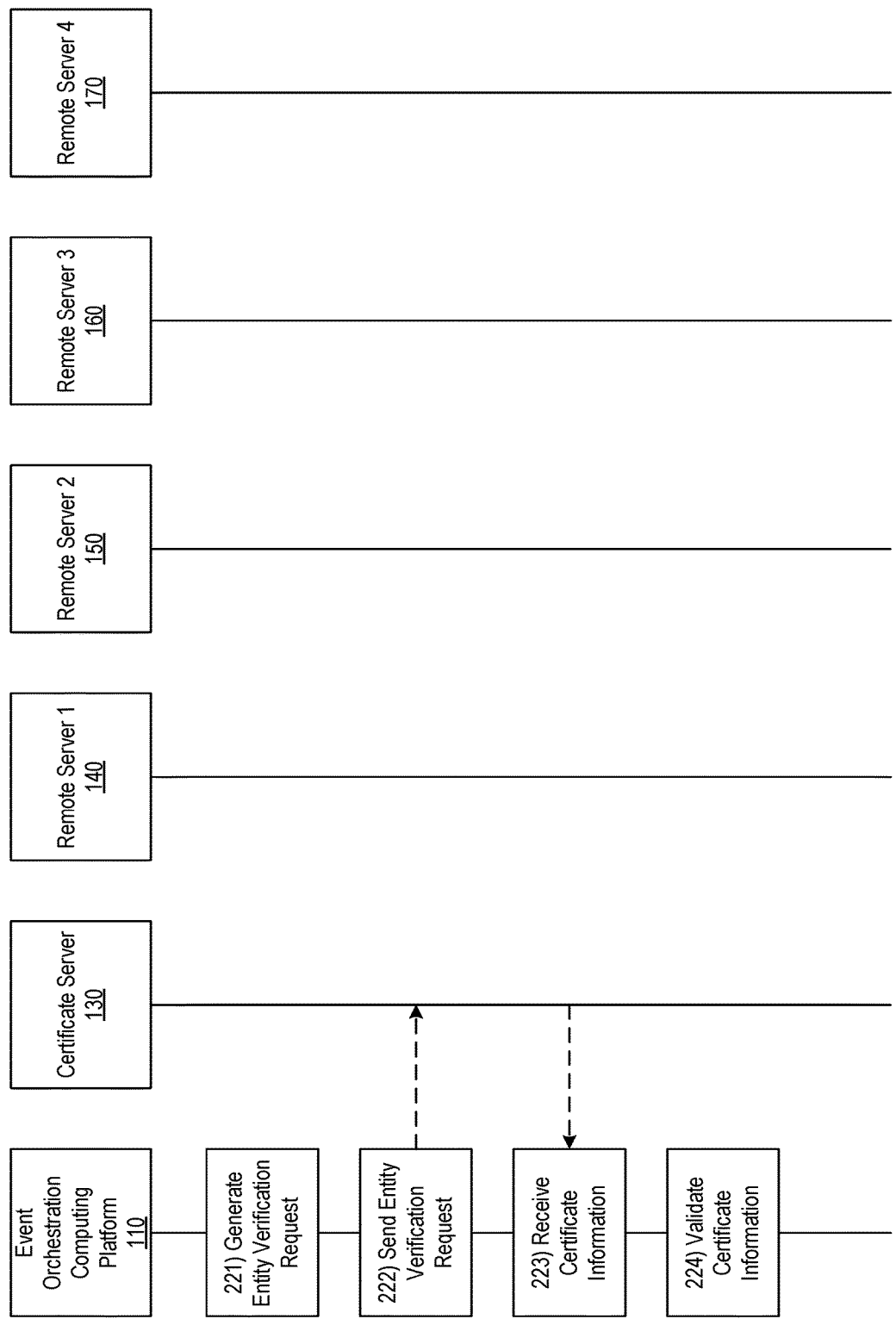

Referring to FIG. 2F, at step 221, event orchestration computing platform 110 may generate an entity verification request. For example, at step 221, based on identifying the second entity associated with the second event request based on the second entity information, event orchestration computing platform 110 may generate a second entity verification request. For instance, event orchestration computing platform 110 may generate an entity verification request that directs and/or causes certificate server 130 to return and/or validate a certificate corresponding to the second entity associated with the second event request, so as to determine whether and/or confirm that the second entity associated with the second event request is authorized and/or otherwise allowed to request the payment transaction event for processing by event orchestration computing platform 110.

At step 222, event orchestration computing platform 110 may send the entity verification request to certificate server 130. For example, at step 222, event orchestration computing platform 110 may send, via the communication interface (e.g., communication interface 116), to the certificate server (e.g., certificate server 130), the second entity verification request.

At step 223, event orchestration computing platform 110 may receive certificate information from certificate server 130. For example, at step 223, event orchestration computing platform 110 may receive, via the communication interface (e.g., communication interface 116), from the certificate server (e.g., certificate server 130), second certificate information associated with the second entity. In some instances, the certificate information (which may, e.g., be received by event orchestration computing platform 110 from certificate server 130) may include a certificate itself, such as a certificate corresponding to the entity identified in the entity verification request sent to certificate server 130 by event orchestration computing platform 110. In some instances, the certificate information (which may, e.g., be received by event orchestration computing platform 110 from certificate server 130) may additionally or alternatively include information indicating that certificate server 130 maintains (or does not maintain) a valid certificate corresponding to the entity identified in the entity verification request sent to certificate server 130 by event orchestration computing platform 110.

At step 224, event orchestration computing platform 110 may validate the certificate information received from certificate server 130. For example, at step 224, event orchestration computing platform 110 may validate the second certificate information associated with the second entity received from the certificate server (e.g., certificate server 130). In validating the second certificate information associated with the second entity received from the certificate server (e.g., certificate server 130), event orchestration computing platform 110 may determine whether the second certificate information associated with the second entity received from the certificate server (e.g., certificate server 130) is valid. For example, if event orchestration computing platform 110 determines that the second certificate information associated with the second entity received from the certificate server (e.g., certificate server 130) is not valid, event orchestration computing platform 110 may generate and/or send one or more error messages (e.g., to remote server 160 and/or one or more other systems and/or devices) and/or the example event sequence may end. Alternatively, if event orchestration computing platform 110 determines that the second certificate information associated with the second entity received from the certificate server (e.g., certificate server 130) is valid, the example event sequence may proceed to step 225 as illustrated in FIG. 2G and as described below.

Figure 2G:
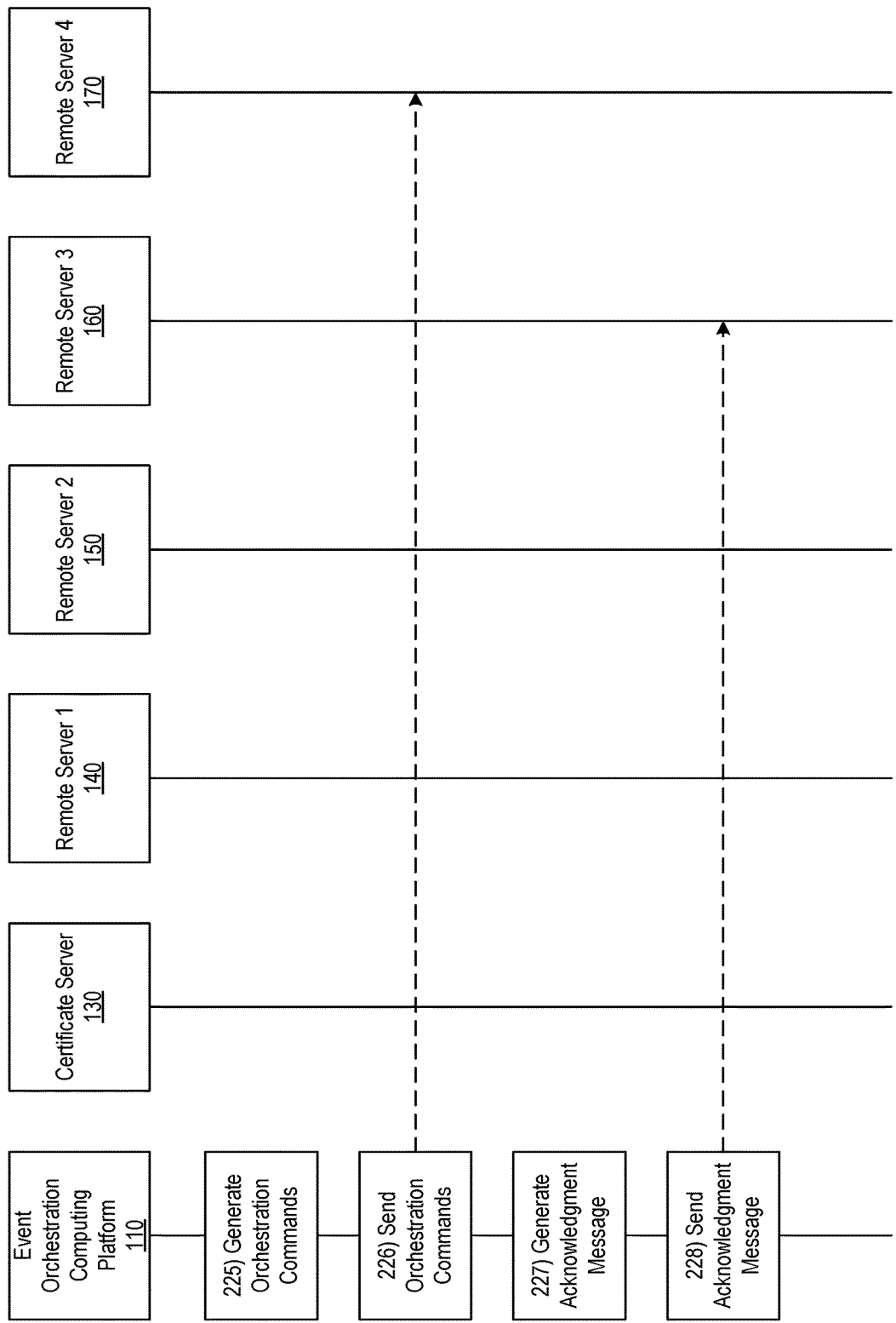

Referring to FIG. 2G, at step 225, event orchestration computing platform 110 may generate one or more orchestration commands (e.g., based on validating the certificate information). For example, at step 225, based on validating the second certificate information associated with the second entity received from the certificate server (e.g., certificate server 130), event orchestration computing platform 110 may generate, based on the second entity information and the second event details information, one or more event orchestration commands directing a fourth server computer system (e.g., remote server 170) to execute one or more actions associated with the second event request. For instance, based on validating the certificate information, event orchestration computing platform 110 may allow the requested payment transaction event to occur and/or coordinate performance of the requested payment transaction event by commanding remote server 170 to execute one or more actions that facilitate completion of the requested payment transaction event.

At step 226, event orchestration computing platform 110 may send the one or more orchestration commands to remote server 170. For example, at step 226, event orchestration computing platform 110 may send, via the communication interface (e.g., communication interface 116), to the fourth server computer system (e.g., remote server 170), the one or more event orchestration commands directing the fourth server computer system (e.g., remote server 170) to execute the one or more actions associated with the second event request.

In some embodiments, the third server computer system may be associated with a third organization in a third country, and the fourth server computer system may be associated with a fourth organization in a fourth country. In addition, the fourth organization may be different from the third organization, and the fourth country may be different from the third country. For example, the third server computer system (e.g., remote server 160) may be associated with a third organization in a third country, and the fourth server computer system (e.g., remote server 170) may be associated with a fourth organization in a fourth country, where the fourth organization may be different from the third organization, and the fourth country may be different from the third country. In this way, event orchestration computing platform 110 may securely process, validate, control, and/or otherwise facilitate payment transaction events involving different entities and servers located in different countries, while ensuring compliance with legal and/or regulatory requirements and/or other rules.

At step 227, event orchestration computing platform 110 may generate an acknowledgement message. For example, at step 227, based on sending the one or more event orchestration commands directing the fourth server computer system (e.g., remote server 170) to execute the one or more actions associated with the second event request, event orchestration computing platform 110 may generate a second acknowledgement message. Such an acknowledgement message may, for example, indicate that the one or more commands have been sent to remote server 170, that the one or more actions have been performed, that the requested payment transaction event is being processed, and/or otherwise indicate the current status of the requested payment transaction event.

In some embodiments, the second acknowledgement message comprises information indicating that the second certificate information associated with the second entity was validated and the one or more event orchestration commands directing the fourth server computer system to execute the one or more actions associated with the second event request were sent to the fourth server computer system. For example, the second acknowledgement message (which may, e.g., be generated by event orchestration computing platform 110 at step 227) may include information indicating that the second certificate information associated with the second entity was validated (e.g., by event orchestration computing platform 110) and the one or more event orchestration commands directing the fourth server computer system (e.g., remote server 170) to execute the one or more actions associated with the second event request were sent to the fourth server computer system (e.g., remote server 170).

At step 228, event orchestration computing platform 110 may send the acknowledgment message to remote server 160. For example, at step 228, event orchestration computing platform 110 may send, via the communication interface (e.g., communication interface 116), to the third server computer system (e.g., remote server 160), the second acknowledgement message. For instance, event orchestration computing platform 110 may send such an acknowledgment message to advise the entity and/or system that requested the payment transaction event of the current status of the requested payment transaction event. Subsequently, event orchestration computing platform 110 may execute one or more actions similar to those discussed above in processing additional requests received from the same and/or other server computer systems.

Figure 3:
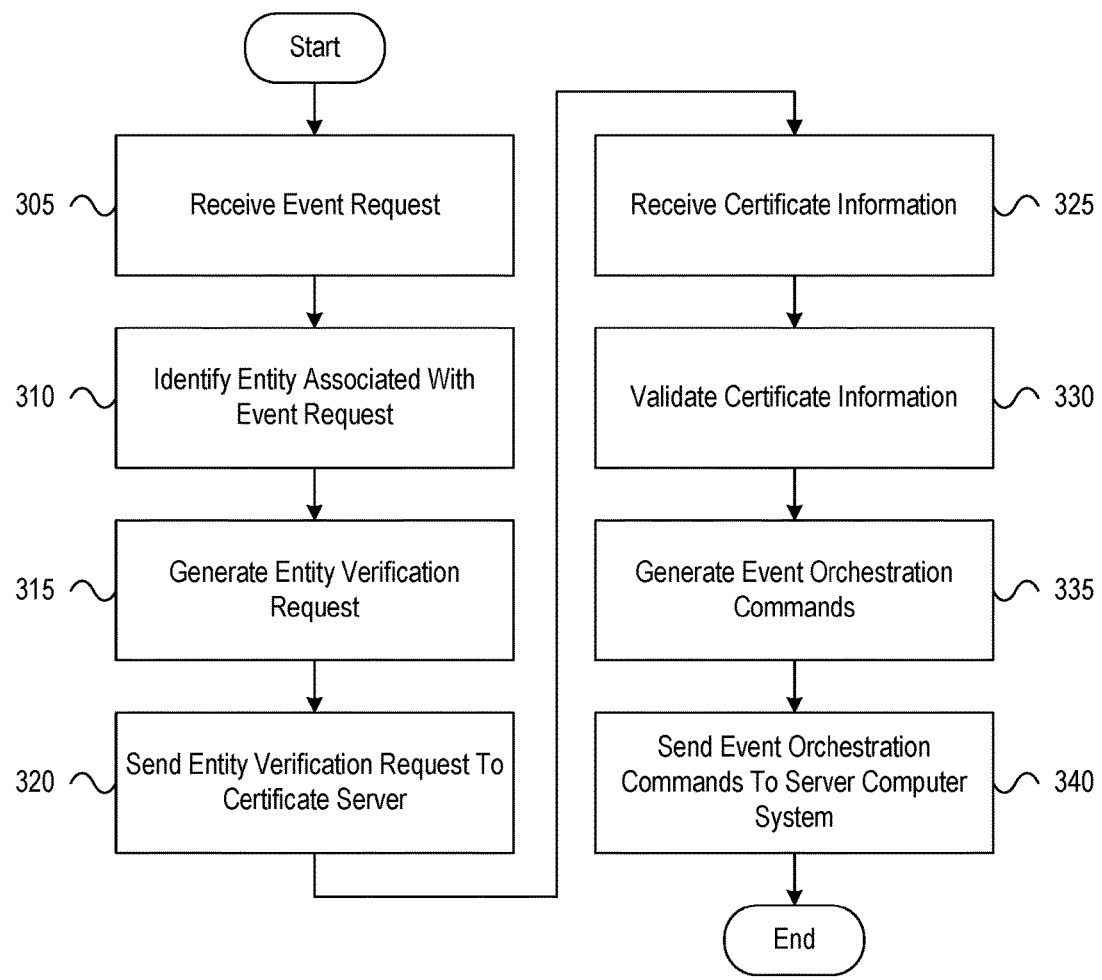
FIG. 3 depicts an illustrative method for securely orchestrating events initiated at remote servers using a certificate server in accordance with one or more example embodiments.

FIG. 3 depicts an illustrative method for securely orchestrating events initiated at remote servers using a certificate server in accordance with one or more example embodiments. Referring to FIG. 3, at step 305, a computing platform having at least one processor, a memory, and a communication interface may receive, via the communication interface, from a first server computer system, a first event request comprising first entity information and first event details information. At step 310, the computing platform may identify a first entity associated with the first event request based on the first entity information. At step 315, based on identifying the first entity associated with the first event request based on the first entity information, the computing platform may generate a first entity verification request. At step 320, the computing platform may send, via the communication interface, to a certificate server, the first entity verification request. At step 325, the computing platform may receive, via the communication interface, from the certificate server, first certificate information associated with the first entity. At step 330, the computing platform may validate the first certificate information associated with the first entity received from the certificate server. At step 335, based on validating the first certificate information associated with the first entity received from the certificate server, the computing platform may generate, based on the first entity information and the first event details information, one or more event orchestration commands directing a second server computer system to execute one or more actions associated with the first event request. At step 340, the computing platform may send, via the communication interface, to the second server computer system, the one or more event orchestration commands directing the second server computer system to execute the one or more actions associated with the first event request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, from a first server computer system, a first event request comprising first entity information and first event details information;
      identify a first entity associated with the first event request based on the first entity information;
      based on identifying the first entity associated with the first event request based on the first entity information, generate a first entity verification request;
      send, via the communication interface, to a certificate server, the first entity verification request;
      receive, via the communication interface, from the certificate server, first certificate information associated with the first entity;
      validate the first certificate information associated with the first entity received from the certificate server;
      based on validating the first certificate information associated with the first entity received from the certificate server, generate, based on the first entity information and the first event details information, one or more event orchestration commands directing a second server computer system to execute one or more actions associated with the first event request; and
      send, via the communication interface, to the second server computer system, the one or more event orchestration commands directing the second server computer system to execute the one or more actions associated with the first event request.

2. The computing platform of claim 1, wherein the memory stores additional computer-readable instructions that, when executed by the at least one processor, cause the computing platform to:
   prior to receiving the first event request from the first server computer system:
      receive, via the communication interface, from at least one remote server computer system, verification information associated with the at least one remote server computer system;
      generate at least one certificate for at least one entity associated with the at least one remote server computer system based on the verification information associated with the at least one remote server computer system; and
      send, via the communication interface, to the certificate server, the at least one certificate generated for the at least one entity associated with the at least one remote server computer system to establish a verification status for future events involving the at least one entity associated with the at least one remote server computer system.

3. The computing platform of claim 2, wherein generating the at least one certificate for the at least one entity associated with the at least one remote server computer system based on the verification information associated with the at least one remote server computer system comprises generating a first certificate for the first entity responsive to receiving compliance information associated with the first entity and validating the compliance information associated with the first entity based on one or more certificate generation rules.

4. The computing platform of claim 1, wherein the memory stores additional computer-readable instructions that, when executed by the at least one processor, cause the computing platform to:
   based on sending the one or more event orchestration commands directing the second server computer system to execute the one or more actions associated with the first event request, generate a first acknowledgement message; and send, via the communication interface, to the first server computer system, the first acknowledgement message.

5. The computing platform of claim 4, wherein the first acknowledgement message comprises information indicating that the first certificate information associated with the first entity was validated and the one or more event orchestration commands directing the second server computer system to execute the one or more actions associated with the first event request were sent to the second server computer system.

6. The computing platform of claim 1, wherein the first server computer system is associated with a first organization in a first country, and the second server computer system is associated with a second organization in a second country, the second organization being different from the first organization, and the second country being different from the first country.

7. The computing platform of claim 1, wherein the first entity information comprises a name and a unique identifier associated with the first entity associated with the first event request.

8. The computing platform of claim 1, wherein the first event details information comprises information identifying a recipient associated with the first event request and a destination country associated with the first event request.

9. The computing platform of claim 1, wherein the memory stores additional computer-readable instructions that, when executed by the at least one processor, cause the computing platform to:

receive, via the communication interface, from a third server computer system, a second event request comprising second entity information and second event details information;

identify a second entity associated with the second event request based on the second entity information;

based on identifying the second entity associated with the second event request based on the second entity information, generate a second entity verification request;

send, via the communication interface, to the certificate server, the second entity verification request;

receive, via the communication interface, from the certificate server, second certificate information associated with the second entity;

validate the second certificate information associated with the second entity received from the certificate server;

based on validating the second certificate information associated with the second entity received from the certificate server, generate, based on the second entity information and the second event details information, one or more event orchestration commands directing a fourth server computer system to execute one or more actions associated with the second event request; and send, via the communication interface, to the fourth server computer system, the one or more event orchestration commands directing the fourth server computer system to execute the one or more actions associated with the second event request.

10. The computing platform of claim 9, wherein the memory stores additional computer-readable instructions that, when executed by the at least one processor, cause the computing platform to:

based on sending the one or more event orchestration commands directing the fourth server computer system to execute the one or more actions associated with the second event request, generate a second acknowledgement message; and send, via the communication interface, to the third server computer system, the second acknowledgement message.

11. A method, comprising:

at a computing platform comprising at least one processor, memory, and a communication interface:

receiving, by the at least one processor, via the communication interface, from a first server computer system, a first event request comprising first entity information and first event details information;

identifying, by the at least one processor, a first entity associated with the first event request based on the first entity information;

based on identifying the first entity associated with the first event request based on the first entity information, generating, by the at least one processor, a first entity verification request;

sending, by the at least one processor, via the communication interface, to a certificate server, the first entity verification request;

receiving, by the at least one processor, via the communication interface, from the certificate server, first certificate information associated with the first entity;

validating, by the at least one processor, the first certificate information associated with the first entity received from the certificate server;

based on validating the first certificate information associated with the first entity received from the certificate server, generating, by the at least one processor, based on the first entity information and the first event details information, one or more event orchestration commands directing a second server computer system to execute one or more actions associated with the first event request; and sending, by the at least one processor, via the communication interface, to the second server computer system, the one or more event orchestration commands directing the second server computer system to execute the one or more actions associated with the first event request.

12. The method of claim 11, comprising:

prior to receiving the first event request from the first server computer system:

receiving, by the at least one processor, via the communication interface, from at least one remote server computer system, verification information associated with the at least one remote server computer system;

generating, by the at least one processor, at least one certificate for at least one entity associated with the at least one remote server computer system based on the verification information associated with the at least one remote server computer system; and sending, by the at least one processor, via the communication interface, to the certificate server, the at least one certificate generated for the at least one entity associated with the at least one remote server computer system to establish a verification status for future events involving the at least one entity associated with the at least one remote server computer system.

13. The method of claim 12, wherein generating the at least one certificate for the at least one entity associated with the at least one remote server computer system based on the verification information associated with the at least one remote server computer system comprises generating a first certificate for the first entity responsive to receiving compliance information associated with the first entity and validating the compliance information associated with the first entity based on one or more certificate generation rules.

14. The method of claim 11, comprising:
based on sending the one or more event orchestration commands directing the second server computer system to execute the one or more actions associated with the first event request, generating, by the at least one processor, a first acknowledgement message; and
sending, by the at least one processor, via the communication interface, to the first server computer system, the first acknowledgement message.

15. The method of claim 14, wherein the first acknowledgement message comprises information indicating that the first certificate information associated with the first entity was validated and the one or more event orchestration commands directing the second server computer system to execute the one or more actions associated with the first event request were sent to the second server computer system.

16. The method of claim 11, wherein the first server computer system is associated with a first organization in a first country, and the second server computer system is associated with a second organization in a second country, the second organization being different from the first organization, and the second country being different from the first country.

17. The method of claim 11, wherein the first entity information comprises a name and a unique identifier associated with the first entity associated with the first event request.

18. The method of claim 11, wherein the first event details information comprises information identifying a recipient associated with the first event request and a destination country associated with the first event request.

19. The method of claim 11, comprising:
receiving, by the at least one processor, via the communication interface, from a third server computer system, a second event request comprising second entity information and second event details information;
identifying, by the at least one processor, a second entity associated with the second event request based on the second entity information;
based on identifying the second entity associated with the second event request based on the second entity information, generating, by the at least one processor, a second entity verification request;
sending, by the at least one processor, via the communication interface, to the certificate server, the second entity verification request;
receiving, by the at least one processor, via the communication interface, from the certificate server, second certificate information associated with the second entity;
validating, by the at least one processor, the second certificate information associated with the second entity received from the certificate server;
based on validating the second certificate information associated with the second entity received from the certificate server, generating, by the at least one processor, based on the second entity information and the second event details information, one or more event orchestration commands directing a fourth server computer system to execute one or more actions associated with the second event request; and
sending, by the at least one processor, via the communication interface, to the fourth server computer system, the one or more event orchestration commands directing the fourth server computer system to execute the one or more actions associated with the second event request.

20. One or more non-transitory computer-readable media storing instructions that, when executed by a computing platform comprising at least one processor, memory, and a communication interface, cause the computing platform to:
receive, via the communication interface, from a first server computer system, a first event request comprising first entity information and first event details information;
identify a first entity associated with the first event request based on the first entity information;
based on identifying the first entity associated with the first event request based on the first entity information, generate a first entity verification request;
send, via the communication interface, to a certificate server, the first entity verification request;
receive, via the communication interface, from the certificate server, first certificate information associated with the first entity;
validate the first certificate information associated with the first entity received from the certificate server;
based on validating the first certificate information associated with the first entity received from the certificate server, generate, based on the first entity information and the first event details information, one or more event orchestration commands directing a second server computer system to execute one or more actions associated with the first event request; and
send, via the communication interface, to the second server computer system, the one or more event orchestration commands directing the second server computer system to execute the one or more actions associated with the first event request.

\* \* \* \* \*